(12) United States Patent
Biondo Junior et al.

(10) Patent No.: US 11,573,929 B2
(45) Date of Patent: Feb. 7, 2023

(54) DEDUPLICATION OF ENCRYPTED DATA USING MULTIPLE KEYS

(71) Applicant: KYNDRYL, INC., New York, NY (US)

(72) Inventors: Jose Gilberto Biondo Junior, Valinhos (BR); Juscelino Candido De Lima Junior, Campinas (BR); Marcelo Lopes De Moraes, Hortolandia (BR); Rosana Rueda Elias, Campinas (BR)

(73) Assignee: KYNDRYL, INC., New York, NY (US)

( * ) Notice: Subject to any disclaimer, the term of this patent is extended or adjusted under 35 U.S.C. 154(b) by 232 days.

(21) Appl. No.: 16/844,742

(22) Filed: Apr. 9, 2020

(65) Prior Publication Data
US 2021/0318993 A1    Oct. 14, 2021

(51) Int. Cl.
*G06F 16/00*  (2019.01)
*G06F 16/174*  (2019.01)
*H04L 9/08*  (2006.01)
*H04L 9/06*  (2006.01)

(52) U.S. Cl.
CPC ........ *G06F 16/1748* (2019.01); *H04L 9/0643* (2013.01); *H04L 9/088* (2013.01)

(58) Field of Classification Search
None
See application file for complete search history.

(56) References Cited

U.S. PATENT DOCUMENTS

| | | |
|---|---|---|
| 8,074,049 B2 | 12/2011 | Gelson et al. |
| 8,117,464 B1 | 2/2012 | Kogelnik |
| 8,199,911 B1 | 6/2012 | Tsaur et al. |
| 8,661,259 B2 | 2/2014 | Yocom-Piatt et al. |
| 8,731,190 B2 | 5/2014 | Lumb |
| 8,930,687 B1 | 1/2015 | Robinson et al. |
| 8,959,332 B2 | 2/2015 | Augenstein et al. |
| 9,043,595 B2 | 5/2015 | Lumb |
| 9,086,819 B2 | 7/2015 | Panchbudhe et al. |
| 9,495,552 B2 | 11/2016 | El-Shimi et al. |

(Continued)

FOREIGN PATENT DOCUMENTS

| | | |
|---|---|---|
| CN | 107113164 A | 8/2017 |
| CN | 109101190 A | 12/2018 |

OTHER PUBLICATIONS

WIPO Int'l. Appln. PCT/CN2021/085296, International Search Report and Written Opinion, dated Jun. 24, 2021, 9 pg.

*Primary Examiner* — Hasanul Mobin
(74) *Attorney, Agent, or Firm* — Cuenot, Forsythe & Kim, LLC

(57) ABSTRACT

Deduplication of encrypted data using multiple keys includes responding to a request to store a predetermined set of data in an electronic data store by receiving a hash corresponding to the predetermined set of data, receiving encrypted data generated by encrypting the predetermined set of data using an encryption key, and receiving a key index corresponding to the encryption key. The hash may be determined to match a previously stored hash, the previously stored hash indicating that a previously encrypted version of the predetermined set of data is stored at a physical location in the electronic data store. Based on determining that the hash matches a previously stored hash, the hash, encrypted data, and key index are discarded.

20 Claims, 9 Drawing Sheets

(56) References Cited

U.S. PATENT DOCUMENTS

| | | | |
|---|---|---|---|
| 9,547,774 B2 | 1/2017 | Bestler et al. | |
| 9,602,283 B1 | 3/2017 | Chandra et al. | |
| 9,652,634 B2 | 5/2017 | Wang et al. | |
| 9,779,269 B1* | 10/2017 | Perlman | G06F 16/2291 |
| 2010/0153403 A1* | 6/2010 | Chang | H04L 9/088 |
| | | | 707/769 |
| 2011/0138192 A1* | 6/2011 | Kocher | G06F 8/71 |
| | | | 713/189 |
| 2013/0080765 A1* | 3/2013 | Mohanty | H04L 63/126 |
| | | | 713/150 |
| 2013/0283058 A1 | 10/2013 | Fiske et al. | |
| 2014/0189348 A1* | 7/2014 | El-Shimi | H04L 63/0428 |
| | | | 713/165 |
| 2014/0281486 A1 | 9/2014 | Nayshtut | |
| 2015/0186657 A1 | 7/2015 | Nakhjiri | |
| 2016/0057142 A1 | 2/2016 | Nayshtut et al. | |
| 2016/0077977 A1* | 3/2016 | Narayanamurthy | H04L 63/123 |
| | | | 713/193 |
| 2017/0288861 A1* | 10/2017 | Matthews | H04L 9/0643 |
| 2018/0123800 A1* | 5/2018 | Kim | H04L 9/3271 |
| 2018/0270069 A1 | 9/2018 | Yan | |
| 2018/0364917 A1 | 12/2018 | Ki et al. | |
| 2019/0087115 A1* | 3/2019 | Li | G06F 11/1048 |
| 2019/0332597 A1* | 10/2019 | Marelas | G06F 16/285 |
| 2020/0213109 A1* | 7/2020 | Perlman | H04L 9/0891 |
| 2020/0320046 A1* | 10/2020 | Narayanamurthy | G06F 16/215 |

\* cited by examiner

300

---

Receive a hash corresponding to a predetermined set of data, encrypted data generated by encrypting the predetermined set of data using an encryption key, and a key index corresponding to the encryption key

302

---

Determine that the hash matches a previously stored hash corresponding to a previously encrypted version of the predetermined set of data

304

---

Discard the hash, the encrypted data, and the key index in response to determining the hash matches the previously stored has

DEDUPLICATION OF ENCRYPTED DATA USING MULTIPLE KEYS

BACKGROUND

This disclosure relates to electronic data processing, and more particularly, to processing and storing encrypted electronic data.

Vast amounts of electronic data are generated, processed, and stored on computer systems daily. From large enterprises to individual computer users, there is often a high premium on storing all types of data. There is frequently a reluctance among enterprises and other users to discard data having any likelihood of future value, even if the likelihood may only be slight. One mechanism for mitigating hardware constraints on storing vast amounts of electronic data is deduplication.

SUMMARY

In one or more embodiments, a method can include responding to a request to store a predetermined set of data in an electronic data store by receiving, with computer hardware, a hash corresponding to the predetermined set of data, encrypted data generated by encrypting the predetermined set of data using an encryption key, and a key index corresponding to the encryption key. The method can include determining that the hash matches a previously stored hash, the previously stored hash indicating that a previously encrypted version of the predetermined set of data is stored at a physical location in the electronic data store. The method can include discarding the hash, encrypted data, and key index based on determining that the hash matches a previously stored hash.

In one or more embodiments, a system includes a processor configured to initiate operations. The operations can include responding to a request to store a predetermined set of data in an electronic data store by receiving a hash corresponding to the predetermined set of data, encrypted data generated by encrypting the predetermined set of data using an encryption key, and a key index corresponding to the encryption key. The operations can include determining that the hash matches a previously stored hash, the previously stored hash indicating that a previously encrypted version of the predetermined set of data is stored at a physical location in the electronic data store. The operations can include discarding the hash, encrypted data, and key index based on determining that the hash matches a previously stored hash.

In one or more embodiments, a computer program product includes one or more computer readable storage media having instructions stored thereon. The instructions are executable by a processor to initiate operations. The operations can include responding to a request to store a predetermined set of data in an electronic data store by receiving a hash corresponding to the predetermined set of data, encrypted data generated by encrypting the predetermined set of data using an encryption key, and a key index corresponding to the encryption key. The operations can include determining that the hash matches a previously stored hash, the previously stored hash indicating that a previously encrypted version of the predetermined set of data is stored at a physical location in the electronic data store. The operations can include discarding the hash, encrypted data, and key index based on determining that the hash matches a previously stored hash.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of a method of deduplicating encrypted data according to an embodiment.

DETAILED DESCRIPTION

Figure 1A:
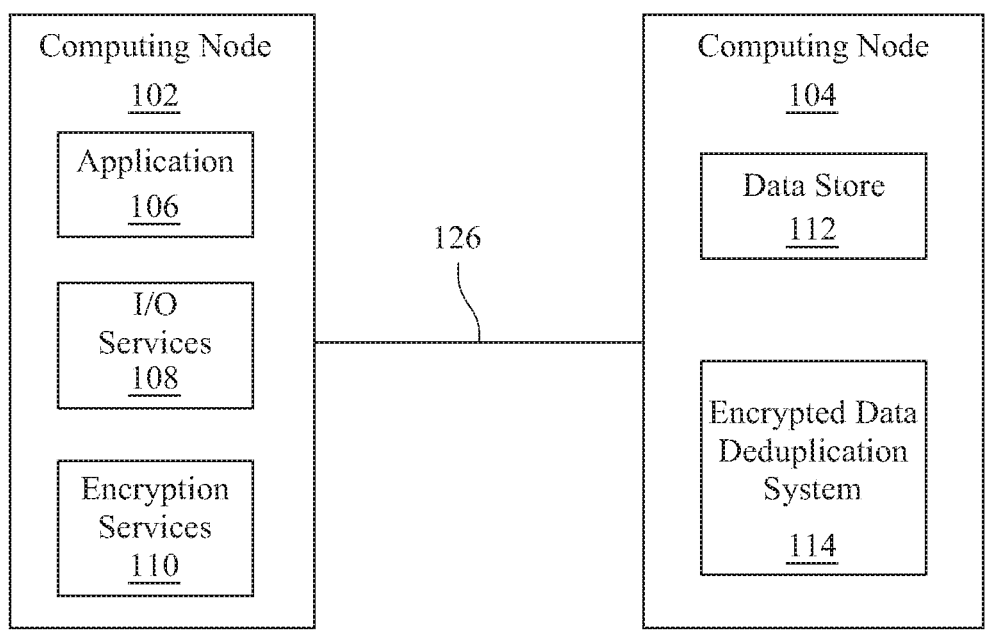
FIGS. 1A and 1B depict an example computing environment and, within the computing environment, an encrypted data deduplication system according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic data processing, and more particularly, to processing and storing encrypted electronic data. Storage of electronic data of any type poses challenges given the finite storage capacity of computer hardware. One way of reducing the amount of electronic data stored is deduplication. Data deduplication substitutes a single copy and logical pointers for repeated strings of data that arise, for example, when multiple versions of a volume, folder, or other data set are generated by an application.

Deduplication of encrypted data can be difficult, however, owing to inherent randomness of encrypted data. One approach is to perform data deduplication first and then perform encryption. The approach, however, is typically limited to "data at rest," that is data that is not transmitted to a second device after encryption. For "in transit" data— that is, data that is transmitted from a host to a storage device, for example—encrypting the data before transmitting the data from a first device to a second device provides security but typically only allows data encrypted with the same encryption key to be deduplicated at the destination, thereby significantly reducing the effectiveness of deduplication.

In accordance with the inventive arrangements disclosed herein, data can be transmitted from a first device (e.g., host computer) to a second device (e.g., storage device) in encrypted form, and the encrypted data can be deduplicated at the destination even when different encryption keys are used to encrypt the data. The inventive arrangements thus enable use of in-transit data encryption while also permitting data deduplication without the use of the same encryption key. The encryption key can change with respect to each data-related interaction, resulting in different encrypted data output. Nevertheless, if the underlying unencrypted data is the same, the inventive arrangements prevent storage of the duplicate data in encrypted form, resulting in a de facto deduplication of the data.

An aspect of certain embodiments disclosed herein is the creation of a data hash (hereinafter "hash") corresponding to a set or block of data (hereinafter "data") before the data is encrypted. The hash is logically linked to a key index assigned to the encryption key used to encrypt the data. The encrypted data, key index, and hash can be transmitted over a data communication link from a first device to a second device. Based on the hash, a determination can be made at the second device as to whether the same data, albeit encrypted, is already stored on the device, in which event the hash matches an existing hash already electronically stored (e.g., in a hash table). Accordingly, there is no need to again store the data. Rather, only an association need be created between the already stored data (encrypted) and the identifier corresponding to the data transmitted.

As defined herein, an "association" is a data structure that programmatically defines a relationship between a first object and a second object. The data structure can comprise a table, text file, and the like. An association described herein is a data structure that logically links or otherwise connects, programmatically, an identified set of data with an encrypted version of the data that is electronically stored in an electronic data store. For example, the data structure can include an identifier associated with the set of data and a variable (e.g., a pointer) that contains the address of a location in computer memory, the location corresponding to the starting point of a block of memory allocated for storing the encrypted data. Thus, the association links an identifier assigned to an encrypted version of the data to a physical location at which the data is electronically stored. If as a result of a prior write operation, the same data—albeit differently encrypted—was previously stored at the physical location, then the association links a data identifier corresponding to the now differently encrypted version to the same physical location. The differently encrypted version is discarded. As a result, there is an implicit deduplication. If, however, the same data was not previously stored, then the present encrypted version of the data is stored, and the hash corresponding thereto is saved along with the address of the location at which the data is stored.

The arrangements described herein are directed to computer technology and provide an improvement to computer technology. Specifically, the arrangements improve computer technology by enabling the deduplication of encrypted data. Deduplication reduces the storage space needed to physically store electronic copies of encrypted data using computer technology. Correspondingly, deduplication enhances the capabilities and efficiency of computer technology in storing non-duplicative encrypted data. Computer technology is further improved by a mechanism for deduplicating encrypted data that is encrypted prior to transmitting the data over a communication link and without requiring use of the same encryption key for performing the deduplication. Rather, the encrypting, transmitting, and deduplicating data can be performed using multiple encryption keys.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1B:
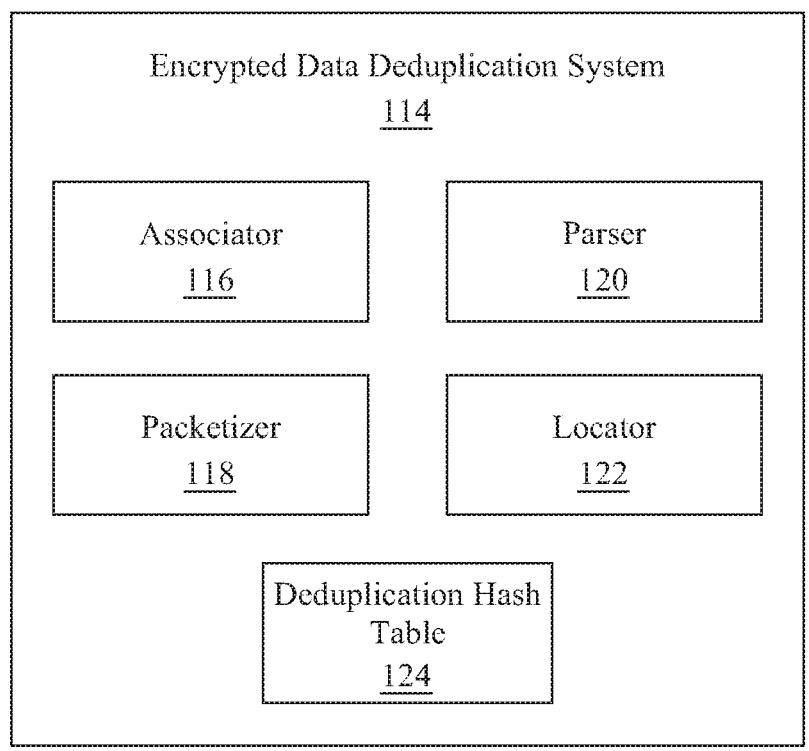
Figure 7:
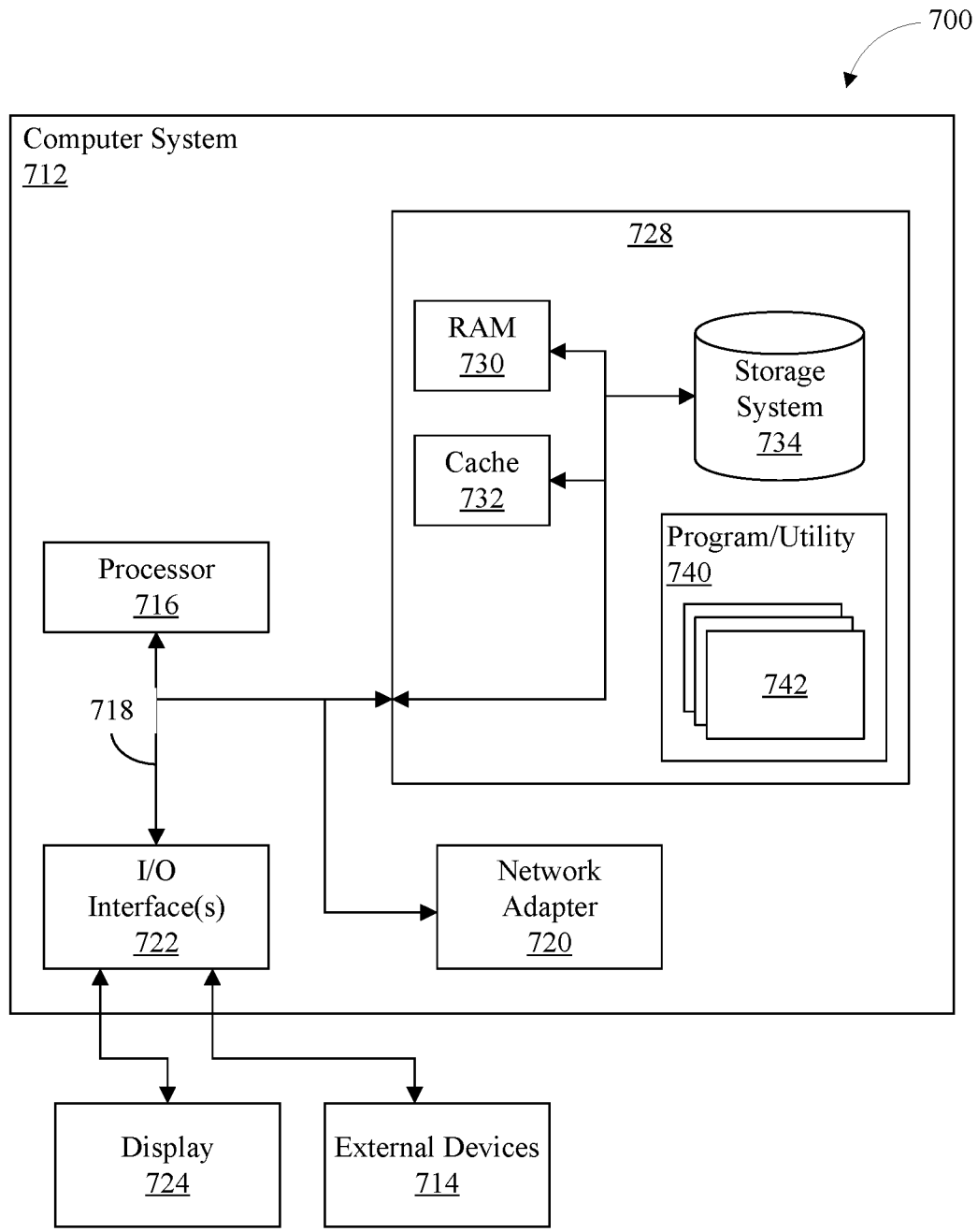
FIG. 7 depicts a cloud computing node according to an embodiment.

FIG. 1A depicts computing environment 100, which is an illustrative example of a computing environment in which an encrypted data deduplication system can be implemented according to one or more embodiments. FIG. 1B depicts an embodiment of the encrypted data deduplication system. Referring initially to FIG. 1A, computing environment 100 illustratively includes computing node 102 and computing node 104. One or both of computing nodes 102 and 104 can include a computer system such as computer system 712 described with reference to computing node 700 (FIG. 7). The computer systems can be any type, including but not limited to mainframe computers, workstations, personal computers, laptop computers, and tablets, as well as communication and smart devices of various types having data processing capabilities, and the like.

Computing node 102 illustratively includes application 106, I/O services 108, and encryption services 110. Application 106 can be implemented in software that executes on one or more processors of computing node 102. I/O services 108 also can be implemented in software as part of an operating system or other system software that also executes on one or more processors of computing node 102. Likewise, encryption services 110 can also be implemented in software that executes on one or more processors of computing node 102. Although, a single application is shown, computing node 102 can include more applications than application 106. Computing node 104 illustratively includes data store 112. Data store 112, for example, can comprise computer memory such as memory 728 of computer system 712 (FIG. 7). Illustratively, computing node 104 also includes encrypted data deduplication system 114.

Although encrypted data deduplication system 114 is shown implemented in computing node 104, in various other embodiments various components of the system described herein can be distributed among multiple computing nodes. For example, some elements of encrypted data deduplication system 114 can be implemented in computing node 102 and other elements in computing node 104. If implemented in separate computing nodes, the different elements of encrypted data deduplication system 114 can be operatively coupled via a network for cooperatively performing the various functions described herein. In still other embodiments encrypted data deduplication system 114 can be implemented in a separate computing node (e.g., cloud-based or other type of server) and be configured to operatively couple to other computing nodes for performing the various operations described herein. For example, encrypted data deduplication system 114 in certain embodiments can be implemented in a distinct computing node such as computing node 700 (FIG. 7) and operatively coupled to computing nodes 102 and 104.

Referring additionally now to FIG. 1B, encrypted data deduplication system 114 illustratively includes associator 116, packetizer 118, parser 120, locator 122, and, optionally, deduplication hash table 124. In certain embodiments, associator 116, packetizer 118, parser 120, and locator 122 can be implemented in processor-executable instructions (software) that execute on one or more processors of a computer system, such as computer system 712 (FIG. 7). In other embodiments, however, one or more of associator 116, packetizer 118, parser 120, and locator 122 can be implemented in dedicated circuitry or a combination of circuitry and software.

Computing nodes 102 and 104 as well as encrypted data deduplication system 114, if implemented in a distinct computing node, can communicatively couple with one another via the same or separate communication links collectively represented by network 126. Accordingly, network 126 can include connections such as wired communication links, wireless communication links, fiber optic cables, or the like. Network 126 can be implemented as, or include, one or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Computing nodes 102 and 104 are capable of communicatively coupling to network 126 via wired and/or wireless communication links. As defined herein, "communication link" means a mode of communication using one or more electronic devices. A communication link is associated with a specific format and/or communication protocol for exchanging data over network 126 or any other type of data communications network. For example, using a specific format and/or communication protocol, an electronic device can transmit data to another electronic device, the data taking various forms such as application program files, volumes, folders, data files, or other types of electronic data which for various reasons it may be desirable to encrypt. An advantage of the arrangements disclosed herein is that encrypted data, even if encrypted using different keys, can be transmitted in encrypted form and yet be deduplicated using the procedures described herein.

Encrypted data deduplication system 114, performing various operations described below, enables data generated by application 106 to be encrypted by encryption services 110 and transmitted, in encrypted form, over a communications link of network 126 to data store 112 residing on computing node 104.

Operatively, encrypted data deduplication system 114 can automatically respond to a request received from a first device (e.g., computing node 102) to store a set of electronic data D on a second device (e.g., computing node 104). Initially, the set of electronic data D is hashed to generate a hash value ("hash") corresponding to the set of electronic data prior to encryption. The hash is generated using a hash function or algorithm (e.g., SHA-512 or other SHA-2 encryption algorithm) implemented with the first device. For data D, hash function H generates hash h:

$$h=H(D).$$

Data D can be encrypted by an encryption service implemented in the first device using encryption algorithm E (any of various encryption algorithms) and encryption key K1. The encryption service on the first device generates encrypted data, Y:

$$Y=E(D,K1).$$

The encryption service can provide a key index (e.g., index 10) that corresponds to the encryption key K1. A data packed comprising hash h, encrypted data Y, and key index 10 is generated at the first device. Optionally, if certain components of encrypted data deduplication system 114 are implemented in the first device, the first device can rely on associator 116 to logically link hash h and key index 10 to Y, the encrypted version of data D, and on packetizer 118 to encapsulate hash h, key index 10, and encrypted data Y in a packet. The first device transmits the packet to the second device over a communications link.

When the packet is received at the second device, parser 120 verifies the structure of the packet to determine that the packet is properly formatted to include encrypted data, a corresponding key index, and hash. If so, then parser 120 parses the packet and obtains the hash and the logically linked key index. Encrypted data deduplication system 114 receives the key index but not the encryption key itself. Parser 120 can search a hash table to determine whether the hash matches an existing hash already present in a hash table corresponding to the data store on the second device. If a matching hash is not found, then encrypted data deduplication system 114 adds the hash to the hash table and electronically stores encrypted data Y at a specific physical location in the data store. Associator 116 (if implemented in the second device) generates an association linking the hash h to the key index 10 and the encrypted version Y of the data D. Locator 122 associates hash h with the physical location at which encrypted data Y is now electronically stored. A pointer can link a name (e.g., Data Set A) or other identifier of the underlying data D to the physical location at which the encrypted version Y of data D is electronically stored.

Once the encrypted version Y of data D is physically stored, de facto deduplication results whenever the same data, albeit in a different encrypted form, is relayed for storage on the same computing node provided that the same hash function is used. For example, a different application (executing on the same or a different computing node as the first) may initiate operations to store data D, under a different identifier and/or encrypted using a different encryption key (having a different key index). Hash function H hashes the same data, thus again generating hash h. However, the second application can generate a different encrypted version of data D by, for example, encrypting the data using a different encryption key (e.g., obtained from a key manager shared with the first application). Using a different encryption key (e.g., key K2), the encryption service renders a different encrypted version of the data D:

$$Y'=E(D,K2).$$

Encrypted data deduplication system 114 again obtains the key index (e.g., 20) but does not obtain the encryption key itself. Y', the encrypted version of data D, is different from Y. Hash h, however, is the same for both Y and Y'. (In both instances the hash is based on and uniquely corresponds to unencrypted data D.) A packet containing encrypted version Y', hash h, and key index 20 is received and parsed by parser 120. The determination is made by encrypted data deduplication system 114 that hash h is already present in the hash table corresponding to the data store. The presence of hash h indicates that data D, albeit in a different encrypted form Y', is already stored. Therefore, to avoid duplication (a de facto deduplication), the packet is discarded. Instead of storing the packet, a new association is generated linking the data set name (e.g., Data Set B) to the physical location at which the earlier encrypted version Y of data D was electronically stored. As described below, any operation to read the stored data, will return the key index (e.g., 10) corresponding to the encryption key used to generate the initial encrypted version of data D, which is the electronically stored version. Although different names may be generated with each operation to store a different encrypted version of data D, each is associated (e.g., by generating a pointer or other data structure) with the same physical location at which the initial encrypted version of the data is stored. Accordingly, the different names are aliases.

Once an initial encrypted version Y of data D is physically stored at a location, every subsequent request to store the same data creates only an association, not a duplicative storing of the data. With each subsequent data store operation, a new association is generated, the association comprising a data structure (e.g., pointer) linking a data identifier to the same physical location at which encrypted version Y is physically stored. Each subsequent request to store data D, results in a different encrypted version of the underlying data, but that version is discarded to avoid duplication. Every request to read data D retrieves encrypted version Y and returns the key index corresponding to the encryption key that generated encrypted version Y. Thus, although any subsequent data store operation after the first may have used a different encryption key and corresponding index, a data read operation returns the key index corresponding to the encryption key that generated the encrypted version that is returned in response to the read request. Users can use different encryption keys and corresponding key indices but need never be aware of the specific key index needed to decrypt the data returned in response to a read request.

Figure 2A:
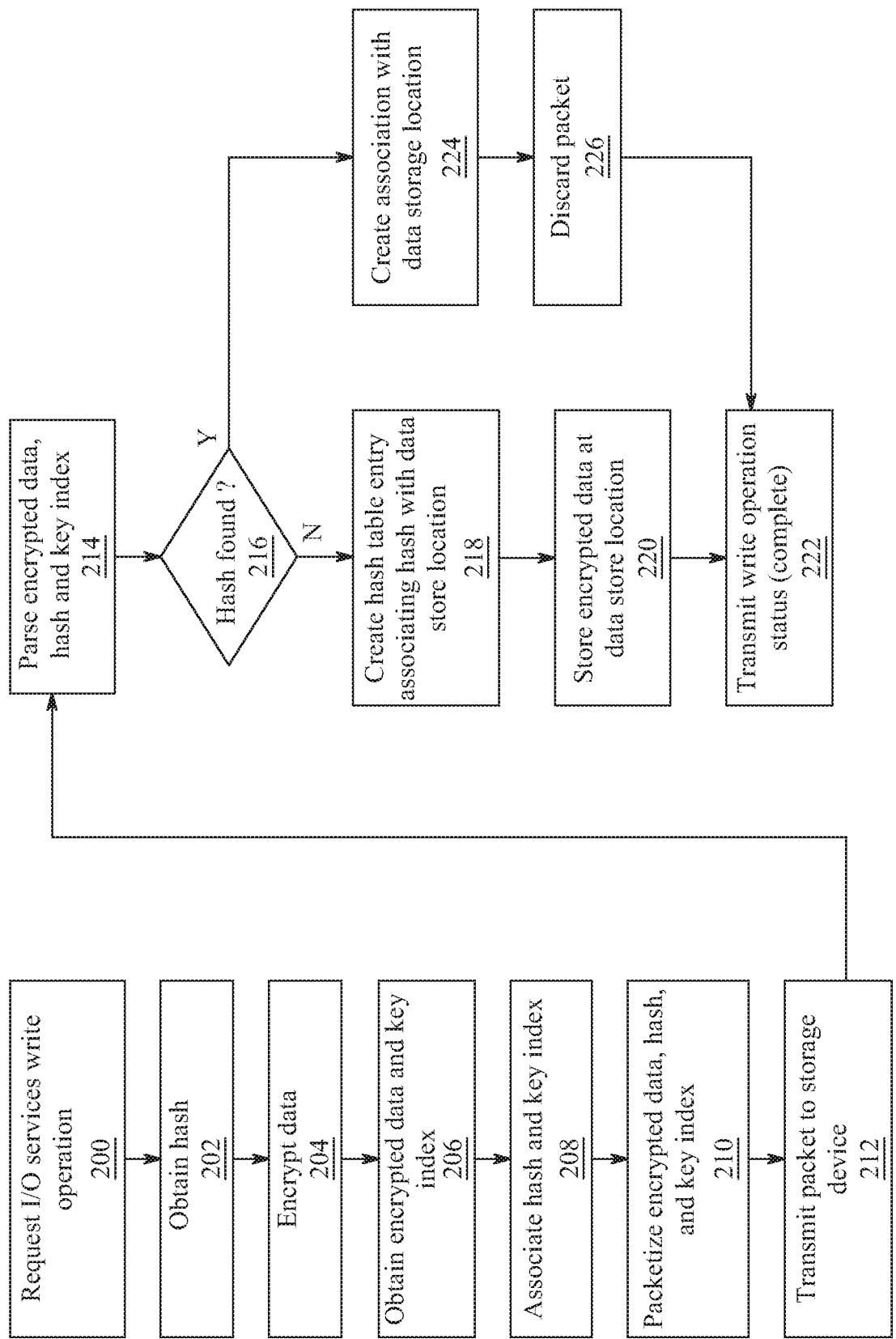
FIGS. 2A and 2B depict certain operative features of an encrypted data deduplication system according to an embodiment.
Figure 2B:
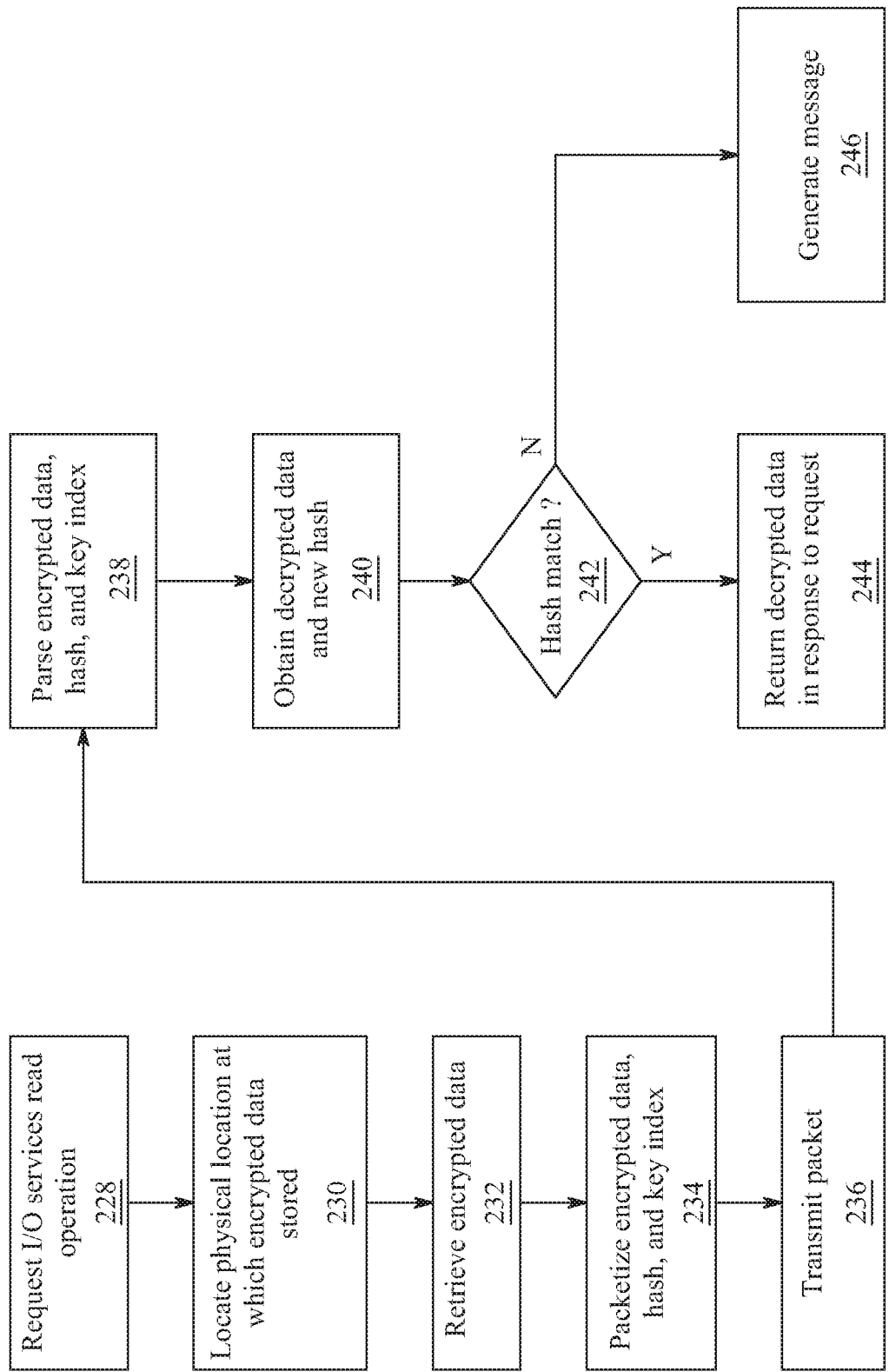

Referring additionally now to FIGS. 2A and 2B, certain of the described operative features of encrypted data deduplication system 114 are illustrated for an embodiment in which the system is implemented in a computing node that stores data received in encrypted form from another computing node. FIG. 2A depicts operative features of encrypted data deduplication system 114 in the context of a write operation, where "write" is broadly defined to refer to any electronic transfer of electronic data to a storage device (e.g., computer system of a computing node). Illustratively, the operation is initiated by an application executing on a first computing node sending a request at block 200 to I/O services executing on the first computing node. The request is to write a set of data (e.g., a file) to data store residing on a second computing node. The set of data to be written is hashed at block 202 to obtain a hash corresponding to the set of data. A hash function generates the hash using a hash algorithm, the hash uniquely corresponding to the set of data. An encryption service executing on the first computing node encrypts the data using an encryption key at block 204. At block 206, the now-encrypted data is associated with a key index corresponding to the encryption key used to encrypt the data. At block 208, the key index is associated with the hash, and block 210 a packet comprising the hash, key index, and encrypted data is generated. The packet is transmitted from the first computing node to the second computing node at block 212. In certain embodiments, encrypted data deduplication system 114 optionally includes an associator (e.g., associator 116) and a packetizer (e.g., packetizer 118) implemented in the first computing node and operatively coupled via a data communications network to elements of the system implemented in the second computing node for associating the hash with the key index (e.g., obtained from a key manager) and packetizing the hash, encrypted data, and key index for transmission over the data communications network.

Encrypted data deduplication system 114 using a parser (e.g., parser 120) parses the packet at block 214, determining whether the packet comprises the correct pattern of encrypted data, hash, and key index. Based on the parsing, encrypted data deduplication system 114 makes a determination at block 216 as to whether the hash matches an existing hash already stored in a hash table. The hash table corresponds to the specific data store (the destination of the encrypted data to be written) of the second computing node. The hash table lists for each block of encrypted data stored a corresponding hash. Each hash in the hash table is uniquely generated by the underlying data that is stored, in encrypted form, at the data store. Optionally, deduplication hash table 124 of encrypted data deduplication system 114 can comprise multiple hash tables, each hash table corresponding to one of multiple different data stores including the data store of the second computing node. Alternatively, the hash table for the data store can reside on the second computing node.

If at block 216, no matching hash is found, then at block 218 encrypted data deduplication system 114 creates an entry in the hash table. The entry is a data structure that associates the hash with a physical location at which the encrypted data is stored. Thus, the newly created entry in the hash table comprises the hash and an association linking the hash to the location in which the encrypted data is newly stored. At block 220, encrypted data deduplication system 114 physically stores the encrypted data at the indicated location. The write operation completed, a write operation status indicating successful completion of the operation is transmitted at block 222.

If at block 216 the hash matches an existing hash, then at block 224 encrypted data deduplication system 114 using an associator implemented in the second computing node creates an association (e.g., a new pointer or other data structure) between a name or other identifier assigned to the encrypted data (e.g., assigned at the time the write operation is initiated) and a physical location (e.g., address) in the data store of the second computing node. (The location can be identified by a locator (e.g., locator 122) implemented in the second computing node.) The physical location is the location at which the identical encrypted data, having the identical hash, has been previously stored. The newly created association can be stored in a table maintained at the first and/or second computing node or within encrypted data deduplication system 114 if the system is implemented in a separate computing node. Optionally, a counter can be incremented to reflect that the data is associated with multiple identifiers (e.g., using multiple pointers). Encrypted data deduplication system 114 discards the packet at block 226. There is therefore no duplication of encrypted data already stored, only a new association.

Different applications at different times may perform a data write operation to save the same data under different data identifiers. However, once the encrypted version of the data is saved, each data identifier is associated (by generating a pointer or other data structure) with the same location at which the encrypted version was initially stored. The data identifier can be the key index corresponding to the encryption used to encrypt the data prior to transmitting the data to a second device for storing. With each separate write operation, a different encryption key can be used to encrypt the underlying data. Thus, as with other data identifiers, multiple key indices may be associated with the stored data. However, with respect to all subsequent read requests after an encrypted version of the data has been stored, encrypted data deduplication system 114 overlays any key index corresponding to a different encryption key with the specific key index of the encryption key that was originally used to generate the encrypted version of the data that is physically stored. Thus, as illustrated below, encrypted data deduplication system 114 ensures that the correct encryption key will be used to decrypt the data in response to a read request, regardless of any encryption performed using a different encryption key.

Referring now to FIG. 2B, certain operative features of encrypted data deduplication system 114 are depicted in the context of a read operation, where "read" is broadly defined to refer to any electronic retrieval of electronic data from a storage device (e.g., computer system of a computing node). Illustratively, an application running on a first computing node initiates an I/O request at block 228 to read a block or set of data stored in a data store of another computing node. Encrypted data deduplication system 114 is invoked in response to the I/O request. The transmitted read request can identify the requested data using a data identifier (e.g., data name, data hash, logical storage location) associated with an original write request. If the data, in encrypted form, is stored in a data store on the second computing node, a corresponding table will include a data structure (e.g., pointer) associating the data identifier with a physical location at which the data is stored. If the data is stored on the second computing node, encrypted data deduplication system 114 at block 230 determines based on the pointer or other data structure the specific location at which the data is stored. (Optionally, a locator (e.g., locator 122) of encrypted data deduplication system 114 implemented in the second computing node can locate the physical location at which the data is stored based on the hash.) A hash table indicates the hash and the key index that are associated with the encrypted data stored at the indicated location. The key index contained in the hash table corresponds to the specific encryption key originally used to encrypt the data that is stored in the data store at the indicated location.

The encrypted version of the data is retrieved from the indicated location at block 232 and at block 234 a packet comprising the encrypted data, hash, and key index is generated. Optionally, in certain embodiments, encrypted data deduplication system 114 includes a locator and packetizer implemented in the second computing node for performing the functions. The packet is transmitted to the first device in response to the read request at block 236. At block 238, the packet is parsed (e.g., by a parser implemented in the first computing node) into constituent components, namely the encrypted data, hash, and key index. Before the encrypted data is decrypted, a check may be performed to verify that the user requesting the data is authorized to access the data. For example, encrypted data deduplication system 114 can determine whether the user has access to the index key that was passed with the encrypted data and hash, or otherwise has permission to access to the requested data. Assuming the user has permission, a decryption service running on the first device decrypts the encrypted data. The decryption service uses the key index provided by encrypted data deduplication system 114 to identify the encryption key (a symmetric encryption key) that is used to decrypt the data. A hash function implemented in the first device can generate a hash corresponding to the decrypted data. Accordingly, at block 240 both the data, now decrypted, and the hash corresponding to the decrypted data are obtained. If at block 242, the hash of the decrypted data matches the hash conveyed in the packet, the decrypted data is provided in response to the read request at 244. Otherwise, at block 246, a message is generated to indicate that the read request could not be successfully completed.

FIG. 3 is a flowchart of method 300 for encrypted data deduplication according to an embodiment. Method 300 can be performed by the same or similar systems described in the context of FIGS. 1, 2A, and 2B. The system responds when a user using a computing node or other networked device initiates an operation to write a predetermined set of data to another such device. At block 302, in response to a request to store a predetermined set of data in an electronic data store, the system retrieves a hash corresponding to the predetermined set of data, encrypted data generated by encrypting the predetermined set of data using an encryption key, and a key index corresponding to the encryption key. The system at block 304 determines whether the hash matches a previously stored hash. A previously stored hash indicates that a previously encrypted version of the predetermined set of data is already stored at a physical location in the electronic data store.

At block 306, the system discards the hash, encrypted data, and key index in response to determining that the hash matches the previously stored hash. The system can generate an association associating the predetermined set of data with the previously encrypted version, the association indicating the physical location in the electronic data store at which the previously encrypted version is stored.

The system in responding to another store request (e.g., a request prior to storing an encrypted version of the predetermined set of data) may retrieve the hash corresponding to the predetermined set of data, encrypted data generated by encrypting the predetermined set of data using a different encryption key, and a key index corresponding to the different encryption key. If the system determines that the hash does not match a previously stored hash, the system stores the encrypted data encrypted using the different encryption key at the physical location in the electronic data store. The system also generates an association associating the hash with the key index corresponding to the different encryption key and with the physical location in the electronic data store.

The system in response to a request to store the predetermined set of data, can generate at a first networked site a packet that includes the hash, encrypted data generated by encrypting the predetermined set of data using an encryption key, and a key index corresponding to the encryption key. The system conveys the packet over a data communications network to a second networked device that hosts the electronic data store. The system electronically stores the encrypted data generated by encrypting the predetermined set of data using the encryption key if the system determines that the hash does not match a previously stored hash. The system discards the packet if the system determines that the hash matches a previously stored hash.

Figure 4:
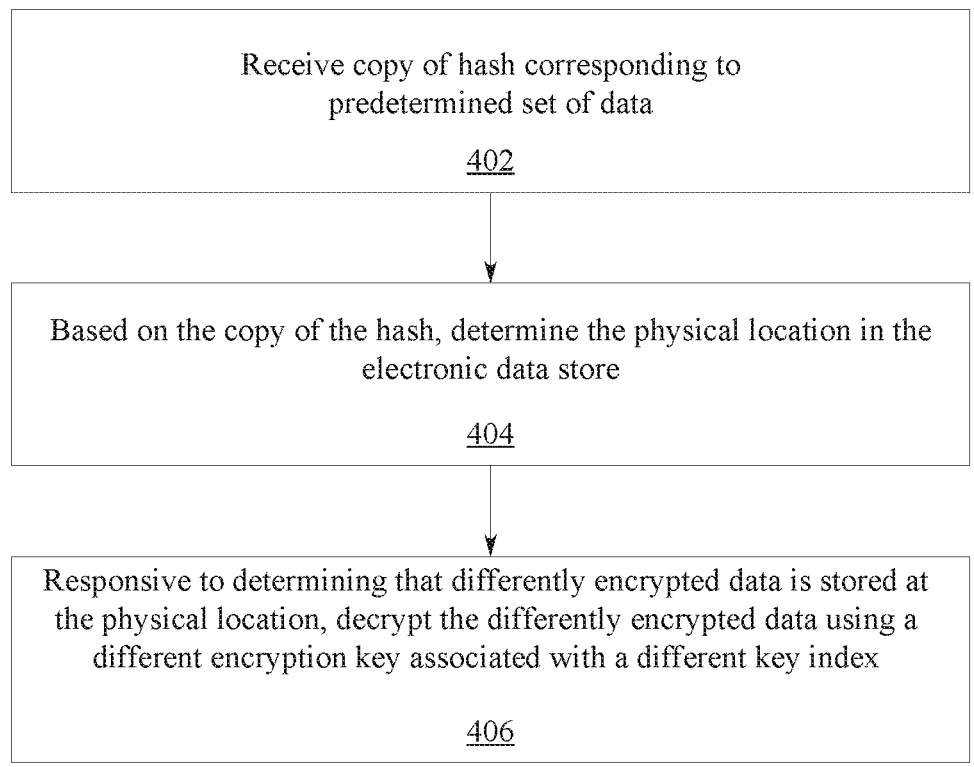
FIG. 4 is a flowchart of a method of deduplicating encrypted data according to an embodiment.

Referring additionally now to FIG. 4, the system can implement method 400 for encrypted data deduplication in the specific context of a data read operation. The system responds when a user using a computing node or other networked device initiates an operation to read the predetermined set of data. At block 402, the system receives a copy of the hash corresponding to the predetermined set of data. Based on the hash, the system at block 404 identifies a physical location in the electronic data store. The hash indicates that the encrypted data at the physical location corresponds to the data requested. However, the encrypted version may not correspond to the encrypted version identified by the data identifier used in the read request. If the system determines that differently encrypted data is stored at the physical location, the system returns a key index corresponding to the encryption key used to encrypt the data as stored. Accordingly, at block 406, responsive to determining that differently encrypted data is stored at the physical location, the system identifies a key index different than the key index corresponding to an encryption key used for a latter encryption of the same data. The different key index is provided to identify the correct encryption key for decrypting the encrypted version of the data retrieved in response to the read request.

In certain embodiments, the system can maintain and update a store of key indices that correspond to multiple encryption keys. The hash corresponds to the key index that is associated with the encryption key that was used to encrypt the predetermined set of data. Thus, knowing the key index, the system can cause (e.g., by operatively coupling with an encryption service) the decrypting of the encrypted version of the data in order to fulfill the read request. The system (nor system user), however, needs the encryption key, but rather, the key index that can identify to an encryption service the correct encryption key for decrypting the electronically stored encrypted version of the data.

Regardless that the read request may have referenced a different key index, the system overlays or substitutes the key index associated with the hash (and corresponding to the correct encryption key) for a key index conveyed with the request. Thus, even though one or more subsequent data store operations after a first may have used different encryption keys and corresponding indices, a data read operation returns the key index corresponding to the encryption key used to generate the encrypted version of data that is returned in response to the read request. Users can use multiple different encryption keys and corresponding key indices but need never be aware of the specific key index needed to decrypt the data returned in response to a read request. Multiple encryption keys can be used without compromising security or impeding deduplication of data.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
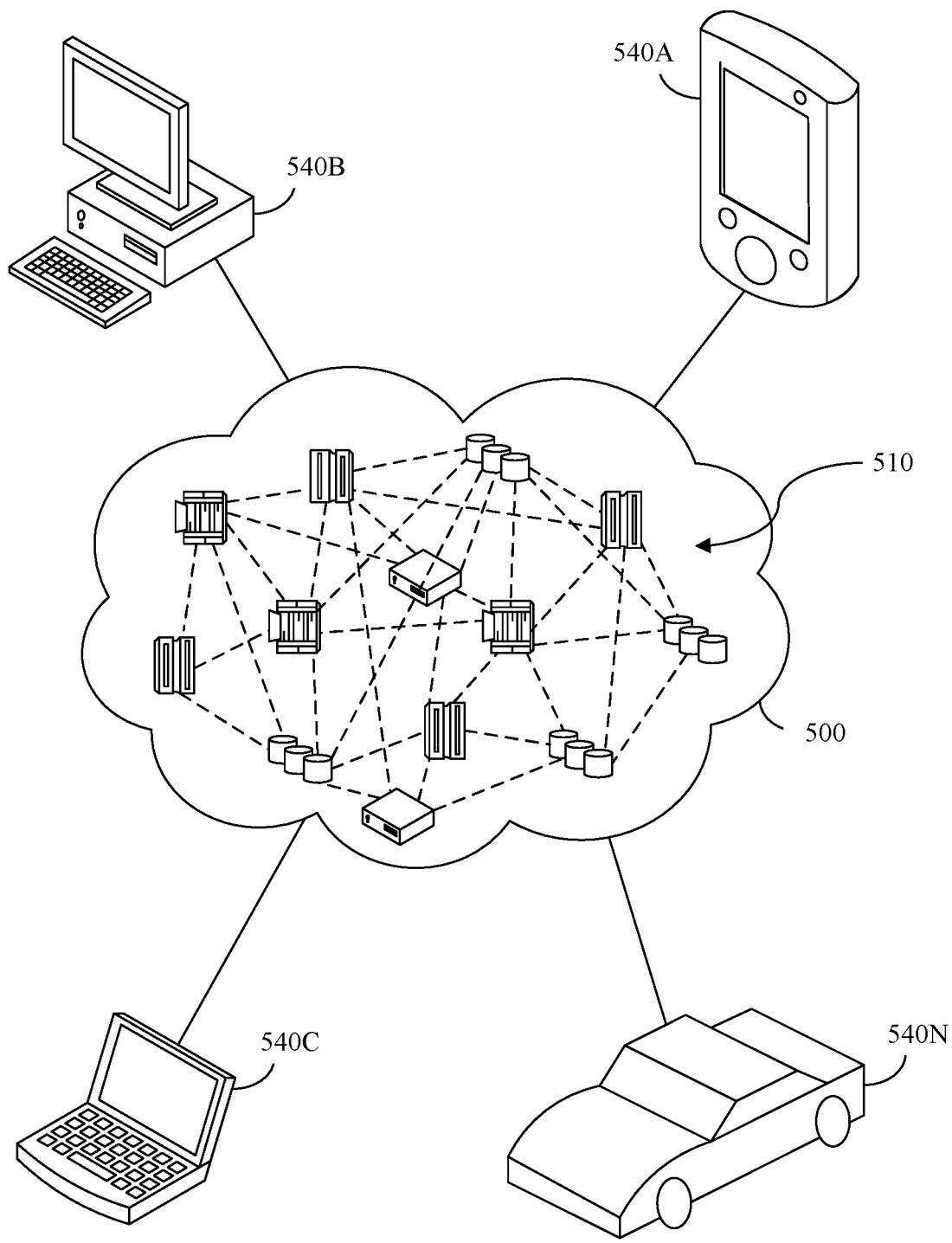
FIG. 5 depicts a cloud computing environment according to an embodiment.

Referring now to FIG. 5, illustrative cloud computing environment 500 is depicted. As shown, cloud computing environment 50 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540a-n shown in FIG. 5 are intended to be illustrative only and that computing nodes 510 and cloud computing environment 500 can communicate with any type of computerized device over any type of network and/or network addressable connection (e.g., using a web browser).

Figure 6:
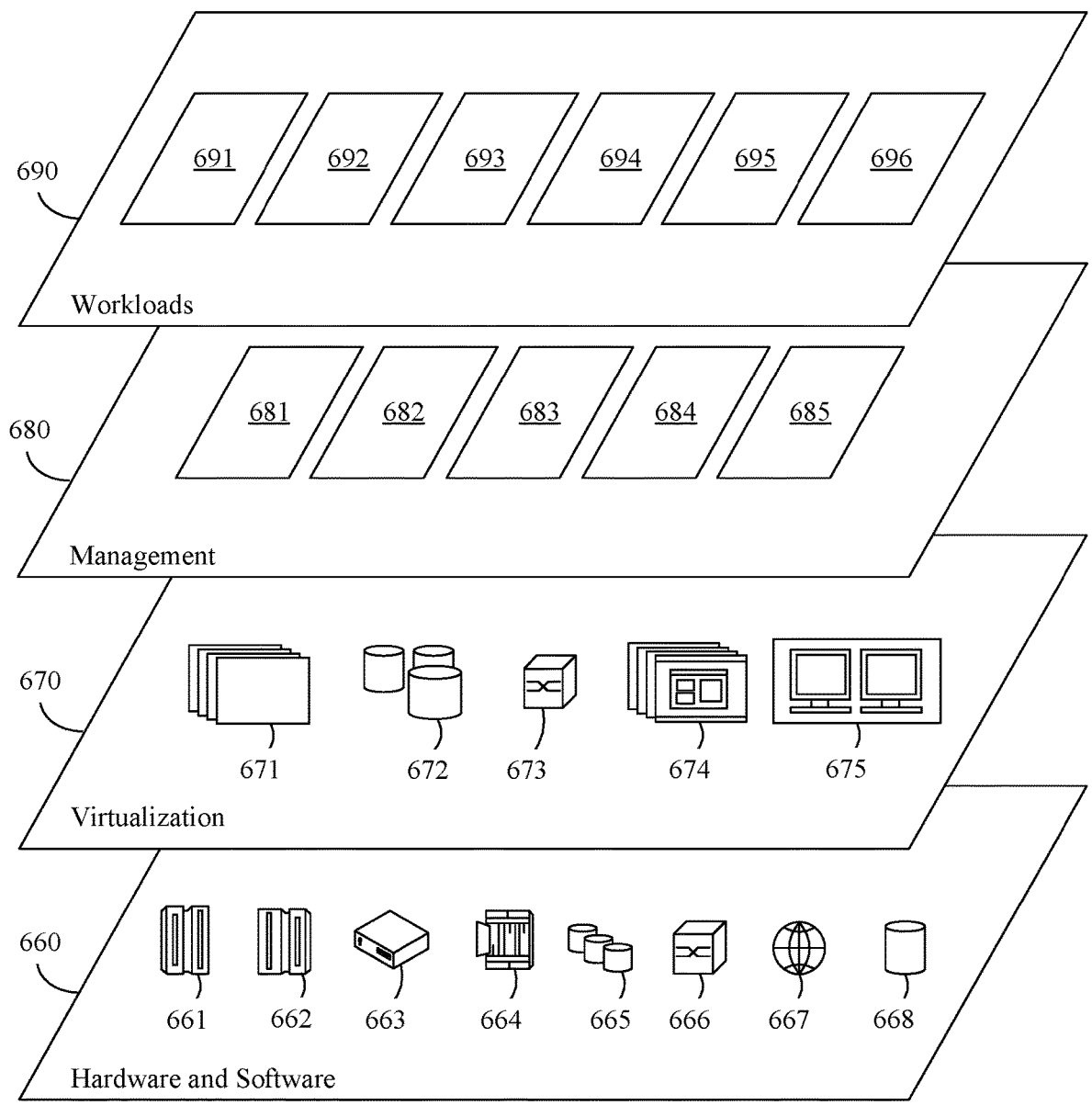
FIG. 6 depicts abstraction model layers according to an embodiment.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 70 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA. Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and system for deduplicating encrypted data 696.

FIG. 7 illustrates a schematic of an example of a computing node 700. In one or more embodiments, computing node 700 is an example of a suitable cloud computing node. Computing node 700 is not intended to suggest any limitation as to the scope of use or functionality of embodiments of the invention described herein. Computing node 700 is capable of performing any of the functionality described within this disclosure.

Computing node 700 includes a computer system 712, which is operational with numerous other general-purpose or special-purpose computing system environments or configurations. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system-executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors 716, a memory 728, and a bus 718 that couples various system components including memory 728 to processor 716. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 718 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 712 typically includes a variety of computer system-readable media. Such media may be any available media that is accessible by computer system 712, and may include both volatile and non-volatile media, removable and non-removable media.

Memory 728 may include computer system readable media in the form of volatile memory, such as random-access memory (RAM) 730 and/or cache memory 732. Computer system 712 may further include other removable/non-removable, volatile/non-volatile computer system storage media. By way of example, storage system 734 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, one or more of the program modules may include system for deduplicating encrypted data 96 or portions thereof.

Program/utility 740 is executable by processor 716. Program/utility 740 and any data items used, generated, and/or operated upon by computer system 712 are functional data structures that impart functionality when employed by computer system 712. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via input/output (I/O) interfaces 722. Still, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

While computing node 700 is used to illustrate an example of a cloud computing node, it should be appreciated that a computer system using an architecture the same as or similar to that described in connection with FIG. 7 may be used in a non-cloud computing implementation to perform the various operations described herein. In this regard, the example embodiments described herein are not intended to be limited to a cloud computing environment. Computing node 700 is an example of a data processing system. As defined herein, "data processing system" means one or more hardware systems configured to process data, each hardware system including at least one processor programmed to initiate operations and memory.

Computing node 700 is an example of computer hardware. Computing node 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 700 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, a "user" is a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
responsive to a request to store a predetermined set of data in an electronic data store, receiving, with computer hardware, a hash corresponding to the predetermined set of data, encrypted data generated by encrypting the predetermined set of data using an encryption key, and a key index corresponding to the encryption key;
determining that the hash matches a previously stored hash, the previously stored hash indicating that a previously encrypted version of the predetermined set of data is stored at a physical location in the electronic data store; and
based on the determining, discarding the hash, the encrypted data, and the key index.

2. The method of claim 1, further comprising generating an association associating the predetermined set of data with the previously encrypted version, the association indicating the physical location in the electronic data store at which the previously encrypted version is stored.

3. The method of claim 1, further comprising responding to a prior request to store the predetermined set of data in the electronic data store by:
receiving the hash corresponding to the predetermined set of data, the encrypted data generated by encrypting the predetermined set of data using a different encryption key, and a key index corresponding to the different encryption key;
determining that the hash does not match a previously stored hash;
storing the encrypted data encrypted using the different encryption key at the physical location in the electronic data store; and
generating an association associating the hash with the key index corresponding to the different encryption key and with the physical location in the electronic data store.

4. The method of claim 1, further comprising responding to a request to read the predetermined set of data by:
receiving a copy of the hash corresponding to the predetermined set of data;
determining, based on the copy of the hash, the physical location in the electronic data store; and
identifying a different key index for decrypting the previously encrypted version of the predetermined set of data using a different encryption key that is associated with the different key index.

5. The method of claim 1, further comprising:
in response to a prior request to store the predetermined set of data, generating at a first networked site a packet that includes the hash, encrypted data generated by encrypting the predetermined set of data using a different encryption key, and a key index corresponding to the different encryption key;
conveying the packet over a data communications network to a second networked device that hosts the electronic data store; and
on the second networked device, electronically storing the encrypted data generated by encrypting the predetermined set of data using the different encryption key in response to determining that the hash does not match the previously stored hash.

6. The method of claim 1, further comprising:
in response to the request, generating at a first networked site a packet that includes the hash, the encrypted data associated with the hash, and the key index; and
conveying the packet over a data communications network to a second networked device that hosts the electronic data store.

7. The method of claim 1, wherein
the encryption key used to encrypt the predetermined set of data is different from an encryption key used to encrypt the previously encrypted version of the predetermined set of data.

8. A system, comprising:
a processor configured to initiate operations including:
responsive to a request to store a predetermined set of data in an electronic data store, receiving a hash corresponding to the predetermined set of data, encrypted data generated by encrypting the predetermined set of data using an encryption key, and a key index corresponding to the encryption key;
determining that the hash matches a previously stored hash, the previously stored hash indicating that a previously encrypted version of the predetermined set of data is stored at a physical location in the electronic data store; and based on the determining, discarding the hash, the encrypted data, and the key index.

9. The system of claim 8, wherein
the processor is configured to initiate operations further comprising generating an association associating the predetermined set of data with the previously encrypted version, the association indicating the physical location in the electronic data store at which the previously encrypted version is stored.

10. The system of claim 8, wherein
the processor is configured to initiate operations further comprising responding to a prior request to store the predetermined set of data in the electronic data store by:
receiving the hash corresponding to the predetermined set of data, encrypted data generated by encrypting the predetermined set of data using a different encryption key, and a key index corresponding to the different encryption key;
determining that the hash does not match a previously stored hash;
storing the encrypted data encrypted using the different encryption key at the physical location in the electronic data store; and
generating an association associating the hash with the key index corresponding to the different encryption key and with the physical location in the electronic data store.

11. The system of claim 8, wherein
the processor is configured to initiate operations further comprising responding to a request to read the predetermined set of data by:
receiving a copy of the hash corresponding to the predetermined set of data;
based on the copy of the hash determining the physical location in the electronic data store; and
identifying a different key index for decrypting the previously encrypted version of the predetermined set of data using a different encryption key that is associated with the different key index.

12. The system of claim 8, wherein
the processor is configured to initiate operations further comprising responding to a prior request to store the predetermined set of data in the electronic data store by:
generating at a first networked site a packet that includes the hash, encrypted data generated by encrypting the predetermined set of data using a different encryption key, and a key index corresponding to the different encryption key;
conveying the packet over a data communications network to a second networked device that hosts the electronic data store; and
on the second networked device, electronically storing the encrypted data generated by encrypting the predetermined set of data using the different encryption key in response to determining that the hash does not match the previously stored hash.

13. The system of claim 8, wherein
the encryption key used to encrypt the predetermined set of data is different from an encryption key used to encrypt the previously encrypted version of the predetermined set of data.

14. A computer program product, the computer program product comprising:
one or more computer-readable storage media and program instructions collectively stored on the one or more computer-readable storage media, the program instructions executable by a processor to cause the processor to initiate operations including:
responsive to a request to store a predetermined set of data in an electronic data store, receiving a hash corresponding to the predetermined set of data, encrypted data generated by encrypting the predetermined set of data using an encryption key, and a key index corresponding to the encryption key;
determining that the hash matches a previously stored hash, the previously stored hash indicating that a previously encrypted version of the predetermined set of data is stored at a physical location in the electronic data store; and
based on the determining, discarding the hash, the encrypted data, and the key index.

15. The computer program product of claim 14, wherein
the program instructions are executable by the processor to cause the processor to initiate operations further comprising generating an association associating the predetermined set of data with the previously encrypted version, the association indicating the physical location in the electronic data store at which the previously encrypted version is stored.

16. The computer program product of claim 14, wherein
the program instructions are executable by the processor to cause the processor to initiate operations further comprising responding to a prior request to store the predetermined set of data in the electronic data store by:
receiving the hash corresponding to the predetermined set of data, encrypted data generated by encrypting the predetermined set of data using a different encryption key, and a key index corresponding to the different encryption key;
determining that the hash does not match a previously stored hash;
storing the encrypted data encrypted using the different encryption key at the physical location in the electronic data store; and
generating an association associating the hash with the key index corresponding to the different encryption key and with the physical location in the electronic data store.

17. The computer program product of claim 14, wherein
the program instructions are executable by the processor to cause the processor to respond to a request to read the predetermined set of data by:
receiving a copy of the hash corresponding to the predetermined set of data;
based on the copy of the hash determining the physical location in the electronic data store; and
identifying a different key index for decrypting the previously encrypted version of the predetermined set of data using a different encryption key that is associated with the different key index.

18. The computer program product of claim 14, wherein
the program instructions are executable by the processor to cause the processor to initiate operations further comprising responding to a prior request to store the predetermined set of data by:
generating at a first networked site a packet that includes the hash, encrypted data generated by encrypting the predetermined set of data using a different encryption key, and a key index corresponding to the different encryption key;

conveying the packet over a data communications network to a second networked device that hosts the electronic data store; and on the second networked device, electronically storing the encrypted data generated by encrypting the predetermined set of data using the different encryption key in response to determining that the hash does not match the previously stored hash.

19. The computer program product of claim 14, wherein the program instructions are executable by the processor to cause the processor to initiate operations further comprising responding to the request to store the predetermined set of data by:

generating at a first networked site a packet that includes the hash, the encrypted data associated with the hash, and the key index; and conveying the packet over a data communications network to a second networked device that hosts the electronic data store.

20. The computer program product of claim 14, wherein the encryption key used to encrypt the predetermined set of data is different from an encryption key used to encrypt the previously encrypted version of the predetermined set of data.

* * * * *